(12) United States Patent
Takezaki

(10) Patent No.: US 8,099,609 B2
(45) Date of Patent: Jan. 17, 2012

(54) INFORMATION PROCESSING APPARATUS AND KEY RECOVERY METHOD

(75) Inventor: Satoshi Takezaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1110 days.

(21) Appl. No.: 11/645,625

(22) Filed: Dec. 27, 2006

(65) Prior Publication Data

US 2007/0172060 A1 Jul. 26, 2007

(30) Foreign Application Priority Data

Jan. 23, 2006 (JP) ................................ 2006-013721

(51) Int. Cl.
*G06F 12/14* (2006.01)

(52) U.S. Cl. ........ 713/193; 713/155; 713/156; 713/170; 713/171; 380/29; 380/239; 380/286

(58) Field of Classification Search ................. 380/239; 713/193
See application file for complete search history.

(56) References Cited

U.S. PATENT DOCUMENTS

| | | | | |
|---|---|---|---|---|
| 6,058,188 A | * | 5/2000 | Chandersekaran et al. | 380/286 |
| 6,118,874 A | * | 9/2000 | Okamoto et al. | 380/282 |
| 6,389,535 B1 | * | 5/2002 | Thomlinson et al. | 713/165 |
| 6,396,929 B1 | * | 5/2002 | Chandersekaran et al. | 380/286 |
| 6,842,523 B1 | * | 1/2005 | Niwa et al. | 380/286 |
| 6,947,556 B1 | * | 9/2005 | Matyas et al. | 380/29 |
| 7,831,833 B2 | * | 11/2010 | Gaylor | 713/176 |
| 7,992,203 B2 | * | 8/2011 | Relyea | 726/20 |
| 2003/0177401 A1 | * | 9/2003 | Arnold et al. | 713/202 |
| 2004/0042620 A1 | * | 3/2004 | Andrews et al. | 380/286 |
| 2004/0249817 A1 | * | 12/2004 | Liu et al. | 707/9 |
| 2006/0222330 A1 | * | 10/2006 | Lankford et al. | 386/94 |
| 2008/0192940 A1 | * | 8/2008 | Feng et al. | 380/286 |

FOREIGN PATENT DOCUMENTS

| | | |
|---|---|---|
| CN | 1702999 | 11/2005 |
| JP | 11-120695 | 4/1999 |
| JP | 2003-224557 | 8/2003 |
| JP | 2004-220682 | 8/2004 |
| WO | WO 2004/081744 | 9/2004 |

OTHER PUBLICATIONS

Chinese Office Action dated Oct. 23, 2009 for Appln. No. 2007100038526.

* cited by examiner

*Primary Examiner* — Kambiz Zand
*Assistant Examiner* — Yonas Bayou
(74) *Attorney, Agent, or Firm* — Pillsbury Winthrop Shaw Pittman, LLP

(57) ABSTRACT

According to one embodiment, an information processing apparatus includes a receiving device including a tuner unit which receives broadcast program data, a first nonvolatile memory which stores an encryption key, and an encryption unit which encrypts the broadcast program data, which is received by the tuner unit, based on the encryption key, and a second nonvolatile memory which is provided on a system board, which is electrically connected to the receiving device, and stores key recovery data for recovering the encryption key which is stored in the first nonvolatile memory.

5 Claims, 7 Drawing Sheets

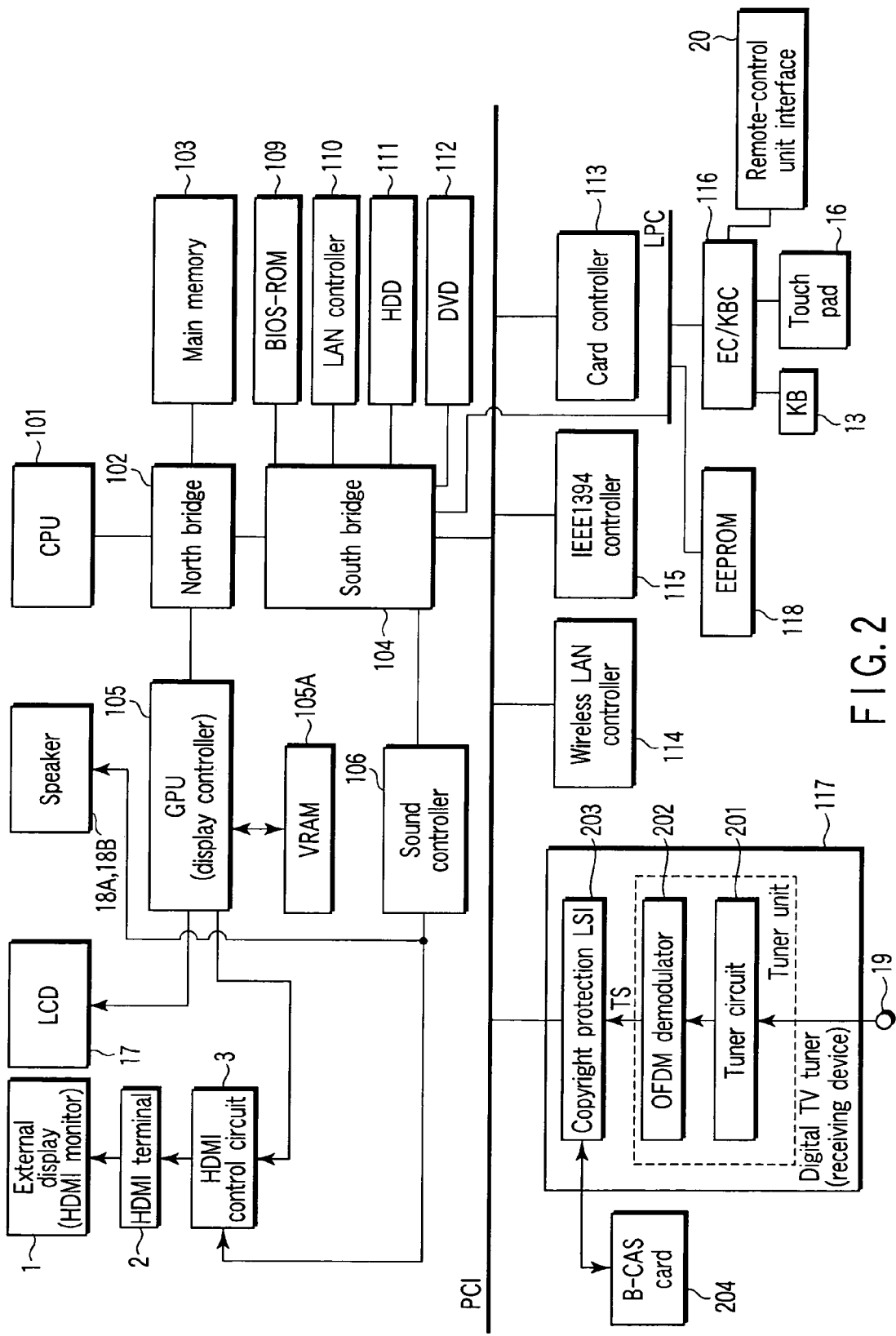
F I G. 2

INFORMATION PROCESSING APPARATUS AND KEY RECOVERY METHOD

CROSS-REFERENCE TO RELATED APPLICATIONS

This application is based upon and claims the benefit of priority from Japanese Patent Application No. 2006-013721, filed Jan. 23, 2006, the entire contents of which are incorporated herein by reference.

BACKGROUND

1. Field

One embodiment of the invention relates to an information processing apparatus such as a personal computer, and more particularly to an information processing apparatus including a receiving device which receives broadcast program data, and a key recovery method for use in the apparatus.

2. Description of the Related Art

In recent years, personal computers having the same AV functions as in audio-video apparatuses such as DVD (Digital Versatile Disc) players and TV apparatuses have been developed. Most of personal computers of this kind have functions of receiving broadcast program data.

With recent development in digitalization of broadcast, there has been a demand for the advent of a scheme which realizes copyright protection of broadcast program data.

Jpn. Pat. Appln. KOKAI Publication No. 2004-220682 discloses a recording/reproducing apparatus having a function of encrypting an AV (audio-video) signal and storing the encrypted AV signal in a hard disk drive.

In the meantime, since a personal computer is implemented by an open architecture, it is possible that broadcast program data which flows over a bus in the personal computer may be hacked. It is thus necessary to provide the personal computer with a firmer copyright protection function.

In usual cases, when the personal computer having the function of receiving broadcast program data is repaired, a tuner board or a system board is replaced. In this case, it is possible that a key for decrypting already recorded encrypted broadcast program data may be lost.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing an example of the system configuration of the information processing apparatus according to the embodiment;

DETAILED DESCRIPTION

Various embodiments according to the invention will be described hereinafter with reference to the accompanying drawings. In general, according to one embodiment of the invention, an information processing apparatus includes a receiving device including a tuner unit which receives broadcast program data, a first nonvolatile memory which stores an encryption key, and an encryption unit which encrypts the broadcast program data, which is received by the tuner unit, based on the encryption key. The information processing apparatus further includes a second nonvolatile memory which is provided on a system board, which is electrically connected to the receiving device, and stores key recovery data for recovering the encryption key which is stored in the first nonvolatile memory.

Figure 1:
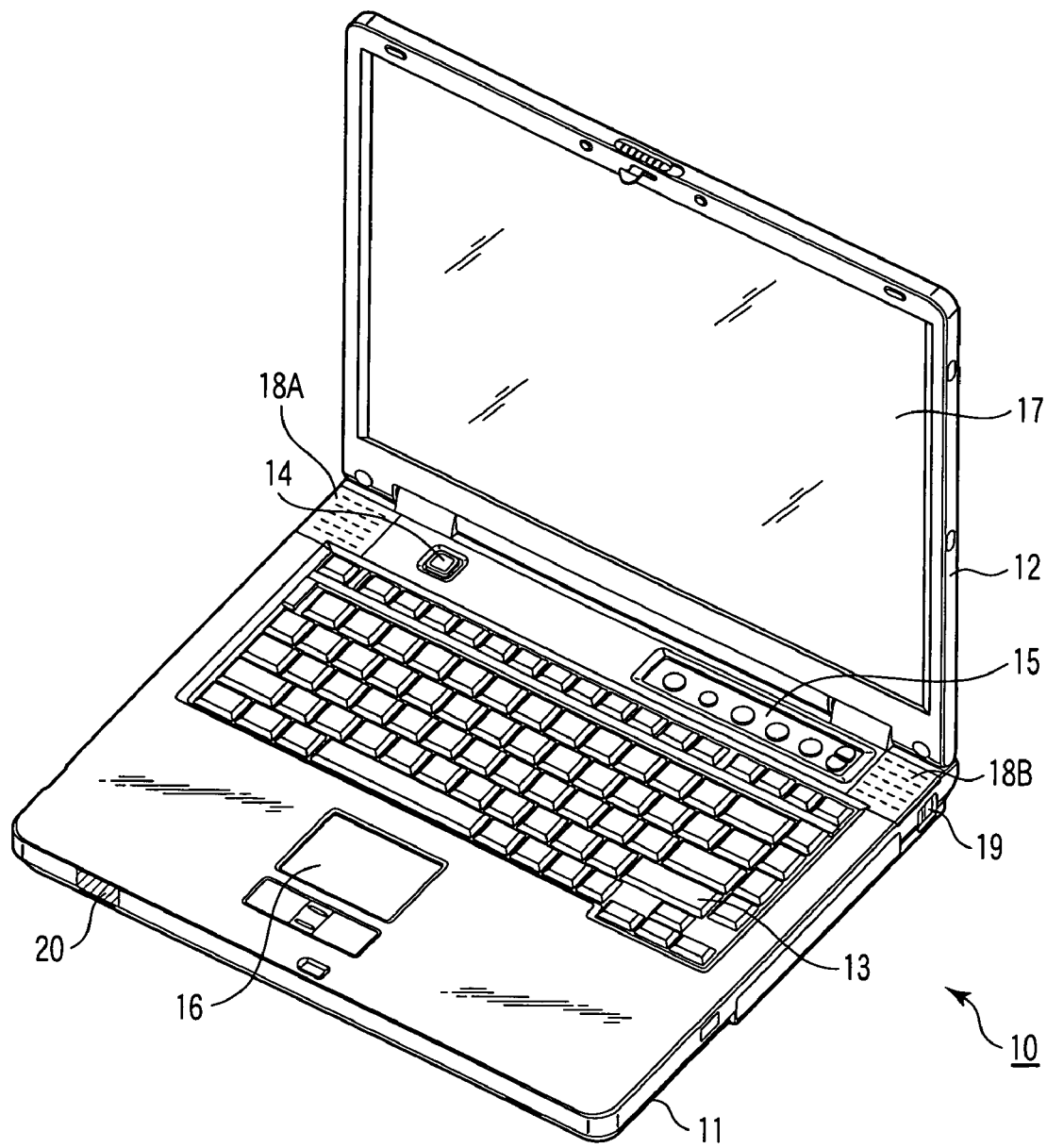
FIG. 1 is an exemplary perspective view showing the external appearance of an information processing apparatus according to an embodiment of the present invention.

To begin with, referring to FIG. 1 and FIG. 2, the structure of the information processing apparatus according to the embodiment of the invention is described. The information processing apparatus is realized, for example, as a notebook portable personal computer 10.

FIG. 1 is a perspective view that shows the state in which a display unit of the notebook personal computer 10 is opened. The computer 10 comprises a main body (hereinafter referred to as "computer main body") 11 and a display unit 12. A display device that is composed of a TFT-LCD (Thin Film Transistor Liquid Crystal Display) 17 is built in the display unit 12. The display screen of the LCD 17 is positioned at an approximately central part of the display unit 12.

The display unit 12 is attached to the computer main body 11 such that the display unit 12 is freely rotatable between an open position and a closed position. The computer main body 11 has a thin box-shaped casing. A keyboard 13, a power button 14 for powering on/off the computer 10, an input operation panel 15, a touch pad 16 and speakers 18A, 18B are disposed on the top surface of the computer main body 11.

The input operation panel 15 is an input device that inputs an event corresponding to a pressed button. The input operation panel 15 has a plurality of buttons for activating a plurality of functions. The buttons include an operation button for controlling a TV function of the computer 10.

A remote-control unit interface unit 20, which executes communication with a remote-control unit that controls the TV function of the computer 10, is provided on a front surface of the computer main body 11. The remote-control interface unit 20 is composed of, e.g. an infrared signal receiving unit.

The computer 10 is capable of receiving and reproducing broadcast program data, e.g. digital broadcast program data such as ground-wave digital TV broadcast program data. An antenna terminal 19 for ground-wave digital TV broadcast is provided, for example, on a right side surface of the computer main body 11. In addition, for example, on a rear surface of the computer main body 11, there is provided an external display connection terminal corresponding to, e.g. HDMI (high-definition multimedia interface) standard. The external display connection terminal is used to output a digital video signal, which corresponds to digital broadcast program data such as ground-wave digital TV broadcast program data, to an external display.

Referring now to FIG. 2, the system configuration of the computer 10 is described.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a card controller 113, a wireless LAN controller 114, an IEEE 1394 controller 115, an embedded controller/keyboard controller IC (EC/KBC) 116, a digital TV tuner (receiving device) 117, and an EEPROM 118.

Of these components, the CPU 101, north bridge 102, main memory 103, south bridge 104, graphics processing unit (GPU) 105, video memory (VRAM) 105A, sound controller 106, BIOS-ROM 109, LAN controller 110, card controller 113, wireless LAN controller 114, IEEE 1394 controller 115, embedded controller/keyboard controller IC (EC/KBC) 116 and EEPROM 118 are provided on a system board (also referred to as "motherboard") which is provided in the computer main body 11, and the components on the system board function as a system unit. The system board is a printed circuit board on which the main components of the computer 10 are mounted. The system board is electrically connected to the digital TV tuner 117.

The digital TV tuner 117 is realized as a unit independent from the system board. For example, the TV tuner 117 is mounted on a tuner board which is composed of a printed circuit board other than the system board. The TV tuner 117 has an encrypting function, and encrypts received broadcast program data and outputs the encrypted broadcast program data to the system unit. The encryption of the broadcast program data is executed on the basis of an encryption key which is stored in the TV tuner 117.

The system unit executes a process of storing the encrypted broadcast program data, which is output from the digital TV tuner 117, into a storage device, e.g. HDD 111, a process of decrypting the encrypted broadcast program data, which is stored in the HDD 111, on the basis of the encryption key that is stored in the digital TV tuner 117, and a process of reproducing the decrypted broadcast program data.

Next, the functions of the respective components are described.

The CPU 101 is a processor which controls the operation of the computer 10. The CPU 101 executes an operating system and various application programs, which are loaded from the hard disk drive (HDD) 111 into the main memory 103. The CPU 101 also executes a system BIOS (Basic Input/Output System) that is stored in the BIOS-ROM 109. The system BIOS is a program for hardware control. The BIOS-ROM 109 also stores a video BIOS (VGA BIOS) for controlling the GPU 105.

The north bridge 102 is a bridge device that connects a local bus of the CPU 101 and the south bridge 104. The north bridge 102 includes a memory controller that access-controls the main memory 103. The north bridge 102 has a function of executing communication with the GPU 105 via, e.g. a PCI EXPRESS serial bus.

The GPU 105 is a display controller for controlling the LCD 17 that is used as a display monitor of the computer 10. A display signal, which is generated by the GPU 105, is sent to the LCD 17. In addition, the GPU 105 can send a digital video signal to an external display device 1 via an HDMI control circuit 3 and an HDMI terminal 2.

The HDMI terminal 2 is the above-mentioned external display connection terminal. The HDMI terminal 2 can send both a digital video signal and a digital audio signal via a single cable to the external display device 1 such as a TV.

The HDMI control circuit 3 is an interface for sending the digital video signal to the external display device 1, which is called "HDMI monitor", via the HDMI terminal 2. The HDMI control circuit 3 has a content protection function such as HDCP (High-bandwidth Digital Content Protection System). The HDMI control circuit 3 executes an authentication process for determining whether the external display device 1, which is connected to the HDMI terminal 2, is a lawful device which supports a content protection function such as HDCP. The HDMI control circuit 3 outputs a digital video signal only when the external display device 1 is determined to be a lawful device. Thereby, the digital video signal, such as broadcast program data, can be output to the outside in a secure state.

The south bridge 104 controls the devices on an LPC (Low Pin Count) bus, and the devices on a PCI (Peripheral Component Interconnect) bus. In addition, the south bridge 104 includes an IDE (Integrated Drive Electronics) controller for controlling the hard disk drive (HDD) 111 and DVD drive 112. The south bridge 104 also includes a function of executing communication with the sound controller 106.

The sound controller 106 is a sound source device, and outputs audio data, which is to be reproduced, to the speakers 18A, 18B or to the HDMI control circuit 3.

The card controller 113 controls card devices such as a PC card and an SD (Secure Digital) card. The wireless LAN controller 114 is a wireless communication device which executes wireless communication of, e.g. IEEE 802.11 standard. The IEEE 1394 controller 115 executes communication with an external device via an IEEE 1394 serial bus.

The embedded controller/keyboard controller IC (EC/KBC) 116 is a 1-chip microcomputer in which an embedded controller for power management and a keyboard controller for controlling the keyboard (KB) 13 and touch pad 16 are integrated. The embedded controller/keyboard controller IC (EC/KBC) 116 has a function of powering on/off the computer 10 in response to the user's operation of the power button 14. Further, the embedded controller/keyboard controller IC (EC/KBC) 116 has a function of executing communication with the remote-control unit interface 20.

The digital TV tuner 117 is a receiving device which receives broadcast program data. For example, the digital TV tuner 117 is configured to receive digital broadcast program data such as ground-wave digital TV broadcast program data. The digital TV tuner 117 is connected to the antenna terminal 19. The digital TV tuner 117 includes a tuner circuit 201, an OFDM (Orthogonal Frequency Division Multiplexing) demodulator 202, and a copyright protection LSI 203.

In the ground-wave digital TV broadcast, MPEG2 is used as a compression-encoding scheme for broadcast program data (video, audio). In addition, SD (Standard Definition) with a standard resolution and HD (High Definition) with a high resolution can be used as video formats.

The tuner circuit 201 and OFDM demodulator 202 function as a tuner unit for receiving broadcast program data. The tuner circuit 201 receives a TV broadcast signal of a specified channel, which is selected from TV broadcast signals which are input from the antenna terminal 19. The OFDM (Orthogonal Frequency Division Multiplexing) demodulator 202 demodulates the TV broadcast signal that is received by the tuner circuit 201, and extracts a transport stream (TS) from the TV broadcast signal. The transport stream is a stream in which a plurality of compression-encoded broadcast program data are multiplexed. The transport stream includes encrypted broadcast program data (video, audio).

The copyright protection LSI 203 executes a process of decrypting the encrypted broadcast program data, and a process of re-encrypting the decrypted broadcast program data and outputting the re-encrypted broadcast program data to the system unit.

The decryption of the encrypted broadcast program data is executed by using, for example, a B-CAS card 204 which is mounted in the computer main body 11. The B-CAS card 204 is an IC card which stores information (key, authentication information, contract information, etc.) for decrypting encrypted broadcast program data. The copyright protection LSI 203 decrypts encrypted broadcast program data by using the information that is stored in the B-CAS card 204. The copyright protection LSI 203 includes a local encryption key (also referred to simply as "key"), and re-encrypts broadcast program data on the basis of the encryption key. The encrypted broadcast program data is sent to the system unit via the PCI bus.

The CPU 101 of the system unit decrypts the encrypted broadcast program data, which is sent from the digital TV tuner 117, on the basis of the encryption key stored in the digital TV tuner 117, that is, the encryption key in the copyright protection LSI 203. The CPU 101 can also execute a recording process for storing the encrypted broadcast program data, which is sent from the digital TV tuner 117, in the HDD 111. In this case, the encrypted broadcast program data is stored in the HDD 111 in the encrypted state. When the encrypted broadcast program data that is stored in the HDD 111 is to be reproduced, the CPU 101 decrypts the encrypted broadcast program data on the basis of the encryption key stored in the digital TV tuner 117.

As described above, the encryption key is managed within the digital TV tuner 117. The digital TV tuner 117 is more secure than the system unit. Thus, the encryption key can be protected against hacking.

In the meantime, if a failure occurs in the computer 10, a worker in a maintenance service center specifies the part of the failure by using a purpose-specific analysis tool, etc. If the occurrence of a failure in the digital TV tuner 117 is detected, the worker of the maintenance service center performs replacement of the digital TV tuner 117 with a new digital TV tuner 117. In this case, the encryption key for decrypting encrypted broadcast program data which is already stored in the HDD 111 is lost. Thus, it becomes impossible to normally reproduce the encrypted broadcast program data which is already stored in the HDD 111.

In the present embodiment, in order to solve this problem, the EEPROM 118 is provided in the system unit. The EEPROM 118 is provided on the system board. The EEPROM 118 is a nonvolatile memory (second nonvolatile memory) that stores key recovery data. The key recovery data is data for recovering the encryption key that is stored in the digital TV tuner 117. For example, by subjecting the key recovery data to a specific arithmetic operation, the original encryption key stored in the digital TV tuner 117 can be recovered. The arithmetic method for recovering the original encryption key is not made public. For example, data (intermediate product) which is generated during a process of generating the encryption key can be used as the key recovery data.

In the service center, the encryption key is generated from the key recovery data by a specific tool (software), and the generated encryption key is stored in the new digital TV tuner 117. Thus, the faulty digital TV tuner 117 and new digital TV tuner 117 have the same encryption key. The system unit, to which the new digital TV tuner 117 is connected, acquires the encryption key from the new digital TV tuner 117, and can decrypt the encrypted broadcast program data which is already stored in the HDD 111.

Figure 3:
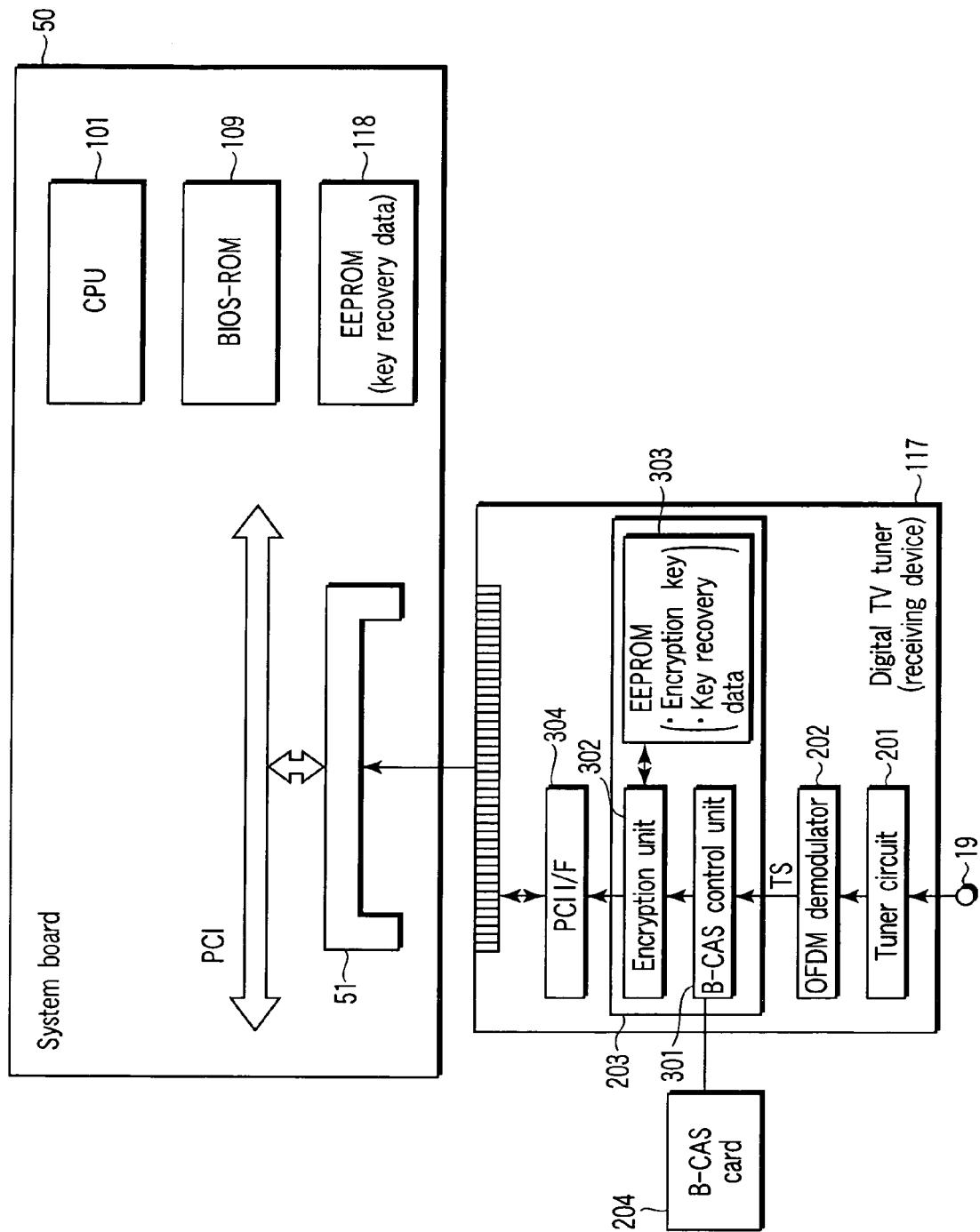
FIG. 3 is an exemplary block diagram showing an example of the structure of a receiving device which is provided in the information processing apparatus according to the embodiment.

FIG. 3 shows an example of the structure of the digital TV tuner 117.

The above-described system unit is mounted on a system board 50 which is electrically connected to the digital TV tuner 117. FIG. 3 depicts only the CPU 101, BIOS-ROM 109 and EEPROM 118 as representative components of the system unit.

The digital TV tuner 117 is electrically connected to the system unit via a bus slot 51 which is provided on the system board 50. Specifically, the digital TV tuner 117 is provided on a tuner board which is detachably connected to the bus slot 51 that is provided on the system board 50. The tuner board is realized by a printed circuit board such as a MiniPCT board.

The digital TV tuner 117 includes a PCI interface unit 304 in addition to the above-described tuner circuit 201, OFDM demodulator 202 and copyright protection LSI 203. The PCI interface unit 304 executes communication with the system unit provided on the system board 50 via the bus slot 51 and PCI bus.

The copyright protection LSI 203 includes a B-CAS control unit 301, an encryption unit 302 and an EEPROM 303. The EEPROM 303 is a nonvolatile memory (first nonvolatile memory) which stores the above-described encryption key. The EEPROM 303 also stores the same key recovery data (copy data of key recovery data) as key recovery data that is stored in the EEPROM 118 on the system board 50 in order to back up the key recovery data stored in the EEPROM 118 on the system board 50.

The B-CAS control unit 301 decrypts the received encrypted broadcast program data by using the information stored in the B-CAS card 204. The encryption unit 203 encrypts the decrypted broadcast program data on the basis of the encryption key that is stored in the EEPROM 303, and outputs the encrypted broadcast program data to the system unit via the PCI interface unit 304.

Figure 4:
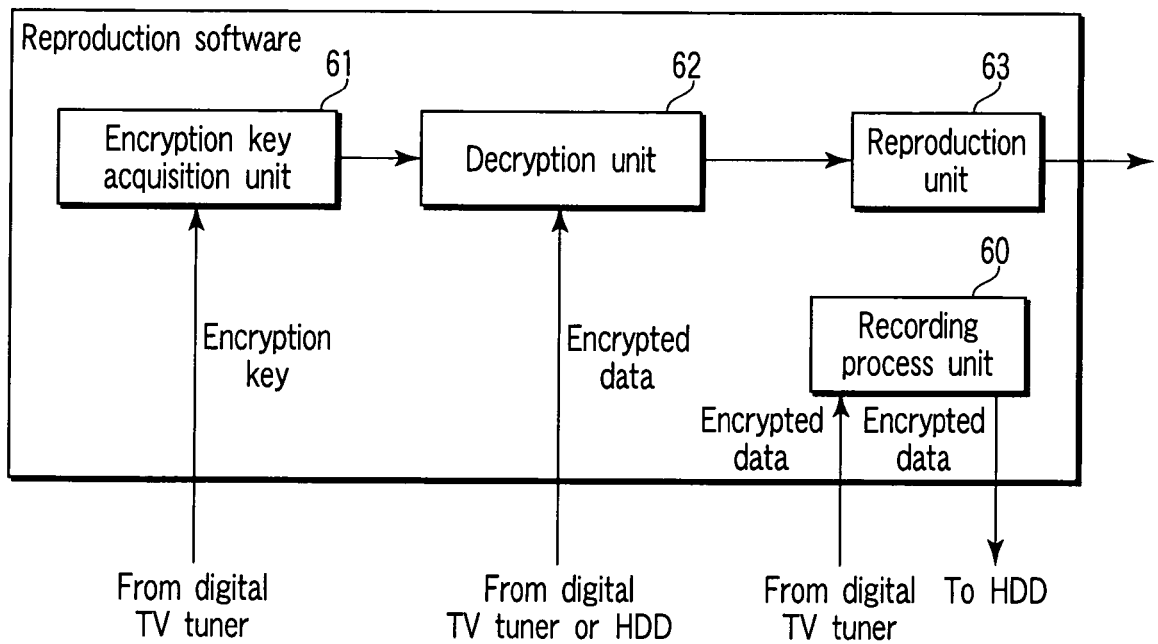
FIG. 4 shows an example of the structure of software which is executed by the information processing apparatus according to the embodiment.

Next, referring to FIG. 4, the functional structure of reproduction software, which is executed by the CPU 101, is described.

The reproduction software is an application program for executing recording and reproduction of broadcast program data that is received by the digital TV tuner 117. The reproduction software includes, as its function execution modules, a recording process unit 60, an encryption key acquisition unit 61, a decryption unit 62 and a reproduction unit 63. These recording process unit 60, encryption key acquisition unit 61, decryption unit 62 and reproduction unit 63 are software modules which are executed by the CPU 101.

The recording process unit 60 executes a process of storing in the HDD 111 the encrypted broadcast program data that is sent from the digital TV tuner 117. The encryption key acquisition unit 61 executes communication with the digital TV tuner 117 and acquires the encryption key from the digital TV tuner 117. The decryption key unit 62 decrypts the encrypted broadcast program data which is sent from the digital TV tuner 117, or the encrypted broadcast program data which is read out of the HDD 111, on the basis of the encryption key that is acquired by the encryption key acquisition unit 61. The reproduction unit 63 executes a reproduction process of reproducing the decrypted broadcast program data. In the reproduction process, the decrypted broadcast program data is separated into audio data and video data. The audio data is sent to the sound controller 106, and the video data is sent to the GPU 105.

Figure 5:
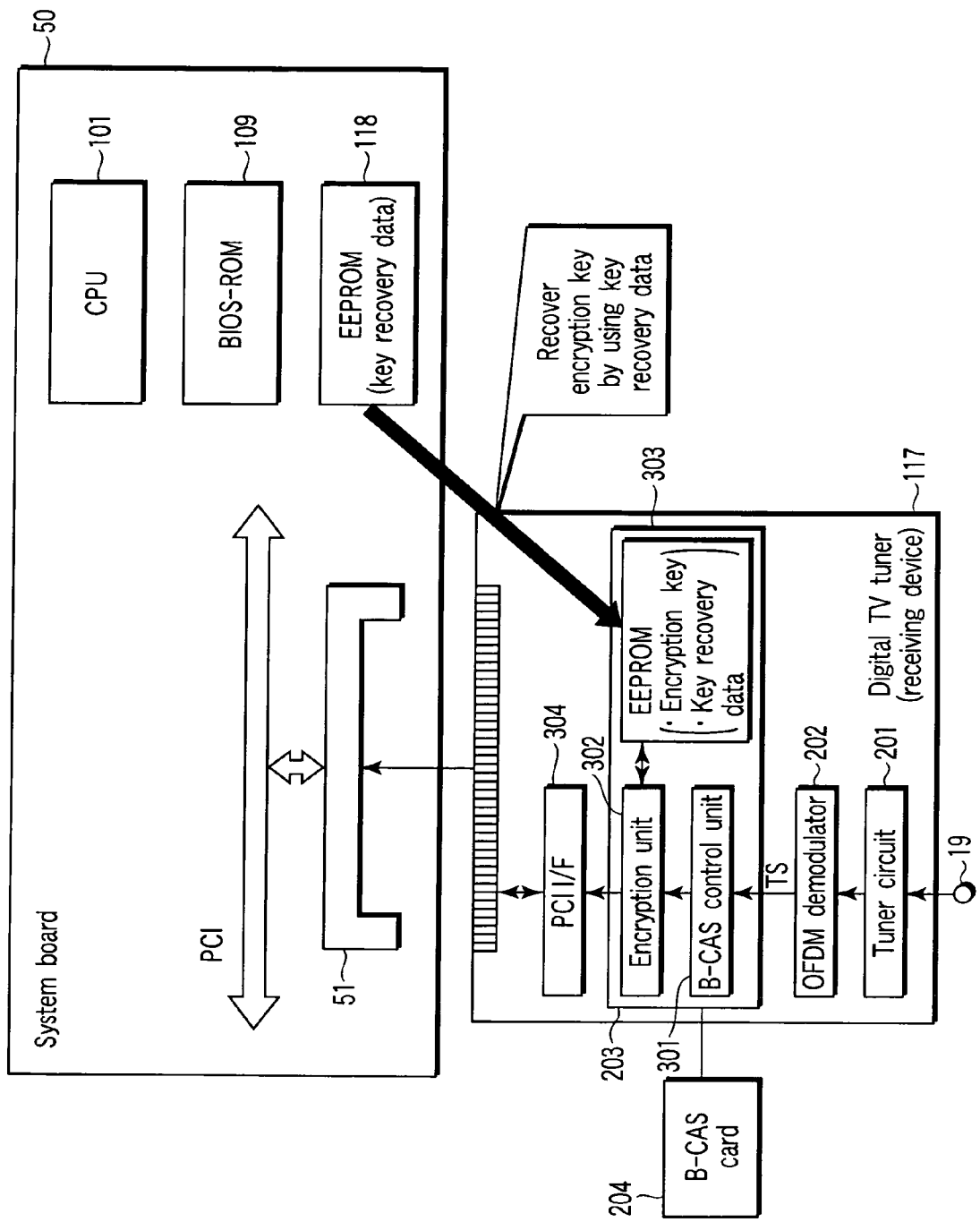
FIG. 5 is an exemplary view for explaining the operation of a key recovery process which is executed by the information processing apparatus according to the embodiment.

FIG. 5 illustrates a scheme of recovering the encryption key that is stored in the digital TV tuner 117.

As described above, if a failure occurs in the digital TV tuner 117 and the faulty digital TV tuner 117 is replaced with a new digital TV tuner, the encryption key, which is necessary for decrypting the encrypted broadcast program data that is already stored in the HDD 111, is lost. In the present embodiment, however, the EEPROM 118 which stores key recovery data is provided on the system board 50. Thus, even if the faulty digital TV tuner 117 is replaced with a new TV tuner, the original encryption key that is stored in the faulty digital TV tuner 117 is recovered from the key recovery data, and the recovered encryption key can be stored in the EEPROM 303 of the new digital TV tuner.

Figure 6:
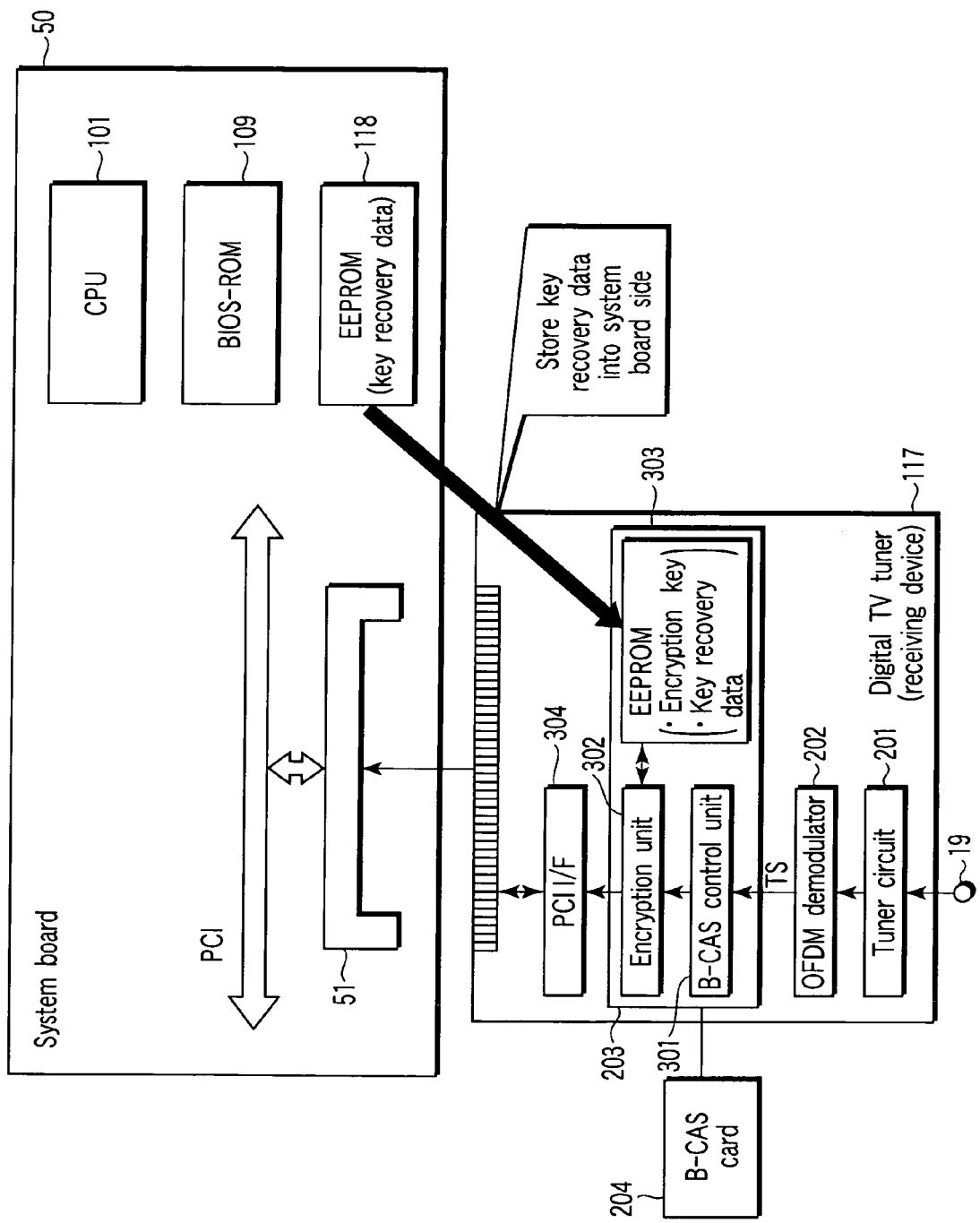
FIG. 6 is an exemplary view for explaining the operation of a key recovery data copy process which is executed by the information processing apparatus according to the embodiment.

In addition, as described above, not only the encryption key but also the key recovery data can be stored in the EEPROM 303 of the digital TV tuner 117. If a failure occurs in the computer 10, there may be a case in which the system board 50 is replaced with a new system board. In this case, the key recovery data for recovering the encryption key of the digital TV tuner 117 is lost. However, since the key recovery data is stored in the EEPROM 303 of the digital TV tuner 117, the key recovery data can be read out of the EEPROM 303, as shown in FIG. 6, and the read-out key recovery data can be written in the EEPROM 118 on the new system board. Thereby, even if a failure occurs in the digital TV tuner 117 in the future, the encryption key can be recovered.

Figure 7:
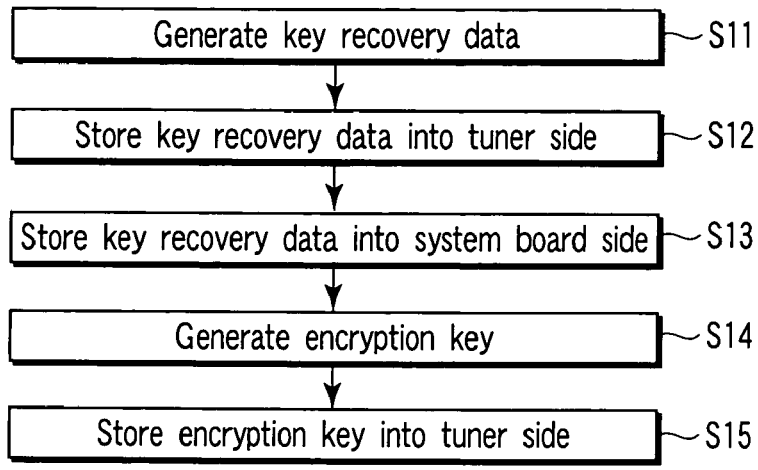
FIG. 7 is an exemplary flow chart showing an example of the procedure of a key storing process which is executed by the information processing apparatus according to the embodiment.

Next, referring to a flow chart of FIG. 7, a description is given of a key storing process for storing the encryption key and key recovery data in the TV tuner 117, and storing the key recovery data in the system unit. This key storing process is executed by using a purpose-specific tool (key storing software) in a maker's factory during a time period from the assembly to the shipment of the computer 10.

The key storing software is installed in the computer 10 via a computer-readable storage medium. The CPU 101 executes the software, thereby carrying out the procedure that is described below.

To start with, the CPU 101 generates key recovery data (block S11). The key recovery data is data that is obtained as an intermediate product during an arithmetic process for generating an encryption key. Specifically, the CPU 101 applies a predetermined function to, e.g. an ID which uniquely identifies the computer 10, thereby carrying out the arithmetic process for generating the encryption key. The key recovery data is generated during this arithmetic process.

The CPU 101 accesses via the PCI bus the digital TV tuner 117 which is connected to the system board 50, and stores the key recovery data in the EEPROM 303 of the digital TV tuner 117 (block S12). In addition, the CPU 101 accesses the EEPROM 118 on the system board 50 and stores the key recovery data in the EEPROM 118 (block S13).

Subsequently, the CPU 101 subjects the key recovery data to a predetermined arithmetic operation, thus generating a unique encryption key for the computer 10 (block S14). The CPU 101 accesses the digital TV tuner 117 via the PCI bus and stores the encryption key in the EEPROM 303 of the digital TV tuner 117 (block S15).

The above-described key storing process may be carried out after shipment of the computer 10. In this case, the computer 10 is shipped in the state in which the above-described key storing software is pre-installed in the HDD 111. For example, at the time of first setup of the operating system, the key storing process is automatically executed.

Figure 8:
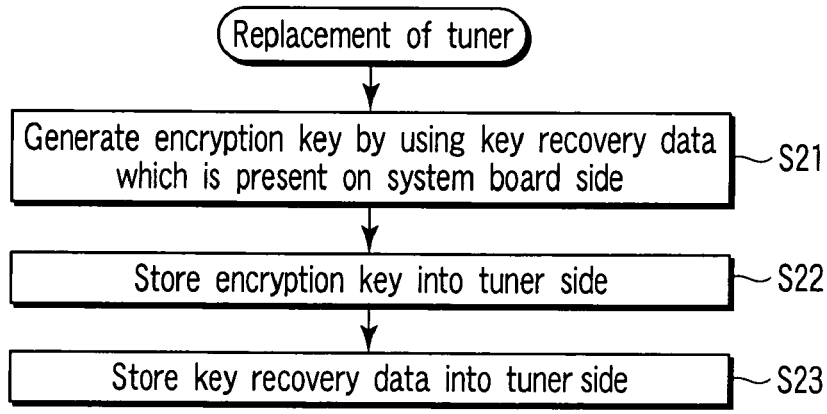
FIG. 8 is an exemplary flow chart showing an example of the procedure of the key recovery process which is executed by the information processing apparatus according to the embodiment.

Next, referring to a flow chart of FIG. 8, a description is given of the procedure of a key recovery process which is executed when the faulty digital TV tuner 117 is to be replaced. This key storing process is executed by using a purpose-specific tool (key recovery software) in the maintenance service center after the faulty digital TV tuner 117 is replaced with a new digital TV tuner.

The key recovery software is installed in the computer 10 via a computer-readable storage medium. The CPU 101 executes this software, thereby carrying out the procedure that is described below.

To start with, the CPU 101 reads out the key recovery data from the EEPROM 118 on the system board 50, and subjects the key recovery data to a predetermined arithmetic operation, thus generating a unique encryption key for the computer 10 (block S21). This encryption key is identical in content to the encryption key that is stored in the faulty digital TV tuner 117.

Subsequently, the CPU 101 accesses via the PCI bus the new digital TV tuner 117 which is connected to the system board 50, and stores the encryption key in the EEPROM 303 of the new digital TV tuner 117 (block S22). Further, the CPU 101 accesses via the PCI bus the new digital TV tuner 117 which is connected to the system board 50, and stores the key recovery data, which is stored in the EEPROM 118 on the system board 50, into the EEPROM 303 of the new digital TV tuner 117 (block S23).

Figure 9:
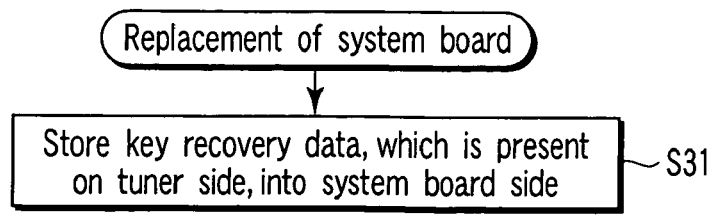
FIG. 9 is an exemplary flow chart showing an example of the procedure of the key recovery data copy process which is executed by the information processing apparatus according to the embodiment.

Next, referring to a flow chart of FIG. 9, a description is given of the procedure of a key recovery data copy process which is executed when the faulty system board 50 is to be replaced. This key recovery data copy process is executed by using a purpose-specific tool (key recovery data copy software) in the maintenance service center after the faulty system board 50 is replaced with a new system board.

This key recovery data copy software is installed in the computer 10 via a computer-readable storage medium. The CPU 101 executes this software, thereby carrying out the procedure that is described below.

The CPU 101 accesses via the PCI bus the digital TV tuner 117 which is connected to the system board 50, reads the key recovery data from the EEPROM 303 of the digital TV tuner 117, and stores the read key recovery data in the EEPROM 118 on the new system board 50 (block S31).

As has been described above, in the present embodiment, the digital TV tuner 117 outputs encrypted broadcast program data. Thus, even if the broadcast program data, which flows over the PCI bus, is hacked, the hacked broadcast program data is prevented from being normally reproduced. In addition, since the EEPROM 118 that stores the key recovery data is provided on the system board 50, even if the digital TV tuner 117 is replaced with a new digital TV tuner, the original encryption key can be recovered.

Therefore, a sufficient copyright protection function is realized, and even after repair such as replacement of the digital TV tuner, already recorded encrypted broadcast program data can correctly be decrypted.

Since the key recovery data stored in the EEPROM 118 is not the encryption key itself, even if the key recovery data in the EEPROM 118 is hacked, the encryption key itself is not stolen.

In the present embodiment, the digital TV tuner 117, which includes the tuner unit that receives digital broadcast program data, is exemplified as the receiving device. Alternatively, an analog TV tuner, which includes a tuner unit that receives analog broadcast program data, may be used as the receiving device.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a main body;
a system board provided in the main body, the system board including a bus slot;
a receiving device provided in the main body, the receiving device including a tuner board detachably connected to the bus slot on the system board, a tuner unit which is provided on the tuner board and receives broadcast program data, a first nonvolatile memory which is provided on the tuner board and stores an encryption key, and an encryption unit which is provided on the tuner board, encrypts the received broadcast program data based on the encryption key and outputs the encrypted broadcast program data;
a storage device provided in the main body;
a system unit which is provided on the system board and executes a process of storing the encrypted broadcast program data, which is output from the receiving device, into the storage device, a process of decrypting the encrypted broadcast program data, which is stored in the storage device, based on the encryption key which is stored in the first nonvolatile memory on the tuner board, and a process of reproducing the decrypted broadcast program data; and
a second nonvolatile memory which is provided on the system board and stores first key recovery data for recovering the encryption key which is stored in the first nonvolatile memory on the tuner board,
wherein the first nonvolatile memory further stores second key recovery data for recovering the encryption key, to back up the first key recovery data stored in the second nonvolatile memory on the system board.

2. The information processing apparatus according to claim 1, wherein each of the first key recovery data and the second key recovery data is data which is generated during a process of generating the encryption key.

3. An information processing apparatus comprising:
a main body;
a system board which is provided in the main body, the system board including a bus slot;
a receiving device provided in the main body, the receiving device including a tuner board which is detachably connected to the bus slot on the system board, a tuner unit which is provided on the tuner board and receives broadcast program data, a first nonvolatile memory which is provided on the tuner board and stores an encryption key, and an encryption unit which is provided on the tuner board and encrypts the broadcast program data, which is received by the tuner unit, based on the encryption key, and outputs the encrypted broadcast program data;
a system unit which is provided on the system board and executes a process of storing the encrypted broadcast program data, which is output from the receiving device, into a storage device, a process of decrypting the encrypted broadcast program data, which is stored in the storage device, based on the encryption key which is stored in the first nonvolatile memory, and a process of reproducing the decrypted broadcast program data; and
a second nonvolatile memory which is provided on the system board and stores first key recovery data for recovering the encryption key which is stored in the first nonvolatile memory, the first key recovery data being composed of data which is generated during a process of generating the encryption key,
wherein the first nonvolatile memory further stores second key recovery data for recovering the encryption key, to back up the first key recovery data stored in the second nonvolatile memory on the system board.

4. A key recovery method which is applied to an information processing apparatus which includes a receiving device including a tuner board detachably connected to a bus slot on a system board, a tuner unit which receives broadcast program data, a first nonvolatile memory which stores an encryption key and key recovery data for recovering the encryption key, and an encryption unit which encrypts the broadcast program data, which is received by the tuner unit, based on the encryption key, and outputs the encrypted broadcast program data, the method comprising:
causing the information processing apparatus to execute a process of storing key recovery data for recovering the encryption key into a second nonvolatile memory which is provided on the system board;
causing the information processing apparatus to execute a process of recovering, after the receiving device is replaced with a new receiving device, the encryption key by using the key recovery data which is stored in the second nonvolatile memory, and storing the recovered encryption key in a first nonvolatile memory in the new receiving device; and
causing the information processing apparatus to execute a process of reading, after the system board is replaced with a new system board, the key recovery data which is stored in the first nonvolatile memory, and storing the read key recovery data into a second nonvolatile memory which is provided on the new system board.

5. The key recovery method according to claim 4, wherein the key recovery data is data which is generated during a process of generating the encryption key.

* * * * *